(12) United States Patent
Calderon et al.

(10) Patent No.: US 7,065,628 B2
(45) Date of Patent: Jun. 20, 2006

(54) INCREASING MEMORY ACCESS EFFICIENCY FOR PACKET APPLICATIONS

(75) Inventors: Juan-Carlos Calderon, Fremont, CA (US); Jing Ling, Fremont, CA (US); Jean-Michel Caia, San Francisco, CA (US); Vivek Joshi, Sunnyvale, CA (US); Anguo T. Huang, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 10/158,409

(22) Filed: May 29, 2002

(65) Prior Publication Data

US 2003/0225991 A1 Dec. 4, 2003

(51) Int. Cl.
 *G06F 12/00* (2006.01)

(52) U.S. Cl. .................... 711/173; 711/129; 711/135; 711/156; 711/171; 709/215; 710/56; 710/57

(58) Field of Classification Search ................ 709/215; 710/56, 57; 711/121, 129, 138, 153, 156, 711/171, 173

See application file for complete search history.

(56) References Cited

U.S. PATENT DOCUMENTS

| 5,920,561 | A | | 7/1999 | Daniel et al. |
| 6,347,097 | B1 | * | 2/2002 | Deng .................... 370/498 |
| 6,539,024 | B1 | * | 3/2003 | Janoska et al. ........... 370/412 |
| 2002/0112102 | A1 | * | 8/2002 | Tarui et al. ................. 710/60 |
| 2004/0131055 | A1 | * | 7/2004 | Calderon et al. .......... 370/381 |

FOREIGN PATENT DOCUMENTS

| WO | 0 498 201 | 8/1992 |
| WO | WO 00/72530 | 11/2000 |

\* cited by examiner

*Primary Examiner*—Christian P. Chace
(74) *Attorney, Agent, or Firm*—Fish & Richardson P.C.

(57) ABSTRACT

Memory access efficiency for packet applications may be improved by transferring full partitions of data. The number of full partitions written to external memory may be increased by temporarily storing packets using on-chip memory that is on a chip with the processor. Before writing packets to external memory, packets of length smaller than the external memory partition size may be temporarily stored in the on-chip memory until an amount corresponding to a full or nearly full partition has been collected, at which point the data can be efficiently written to an external memory partition.

30 Claims, 9 Drawing Sheets

INCREASING MEMORY ACCESS EFFICIENCY FOR PACKET APPLICATIONS

TECHNICAL FIELD

This description relates to a digital communication system, and more particularly to a system that includes a high speed packet-switching network that transports variable-size packets.

BACKGROUND

High speed packet-switching networks, such as Asynchronous Transfer Mode (ATM), Internet Protocol (IP), and Gigabit Ethernet, support a multitude of connections to different sessions. Ideally, packet scheduling transfers packets from the different connections with minimal delay while maximizing the use of available bandwidth. Most communication systems have a very limited amount of storage space on the processing integrated circuit (sometimes called a chip) for processing packets and use additional integrated circuits (i.e., external memory chips) to provide larger amounts of external memory for packet storage.

In ATM networks, where packets (usually called cells) are all of a fixed length, the available bandwidth between the processing chip and external memory chip can be used efficiently by using a memory partition size equal to the size of the cells. In variable-length packet-switching networks, however, memory bandwidth may be wasted whenever a packet length is not an integer multiple of the memory partition size.

DESCRIPTION OF DRAWINGS

Like reference symbols in the various drawings indicate like elements.

DETAILED DESCRIPTION

Digital communication systems typically employ packet-switching systems that transmit blocks of data, called packets. Typically, the data to be sent in a message are longer than the size of a packet, and must be broken into a series of packets. Each packet consists of a portion of the data that is being transmitted and control information in a header used to route the packet through the network to its destination. The last packet of data to be sent in a series of packets is typically referred to as a tail packet.

Figure 1:
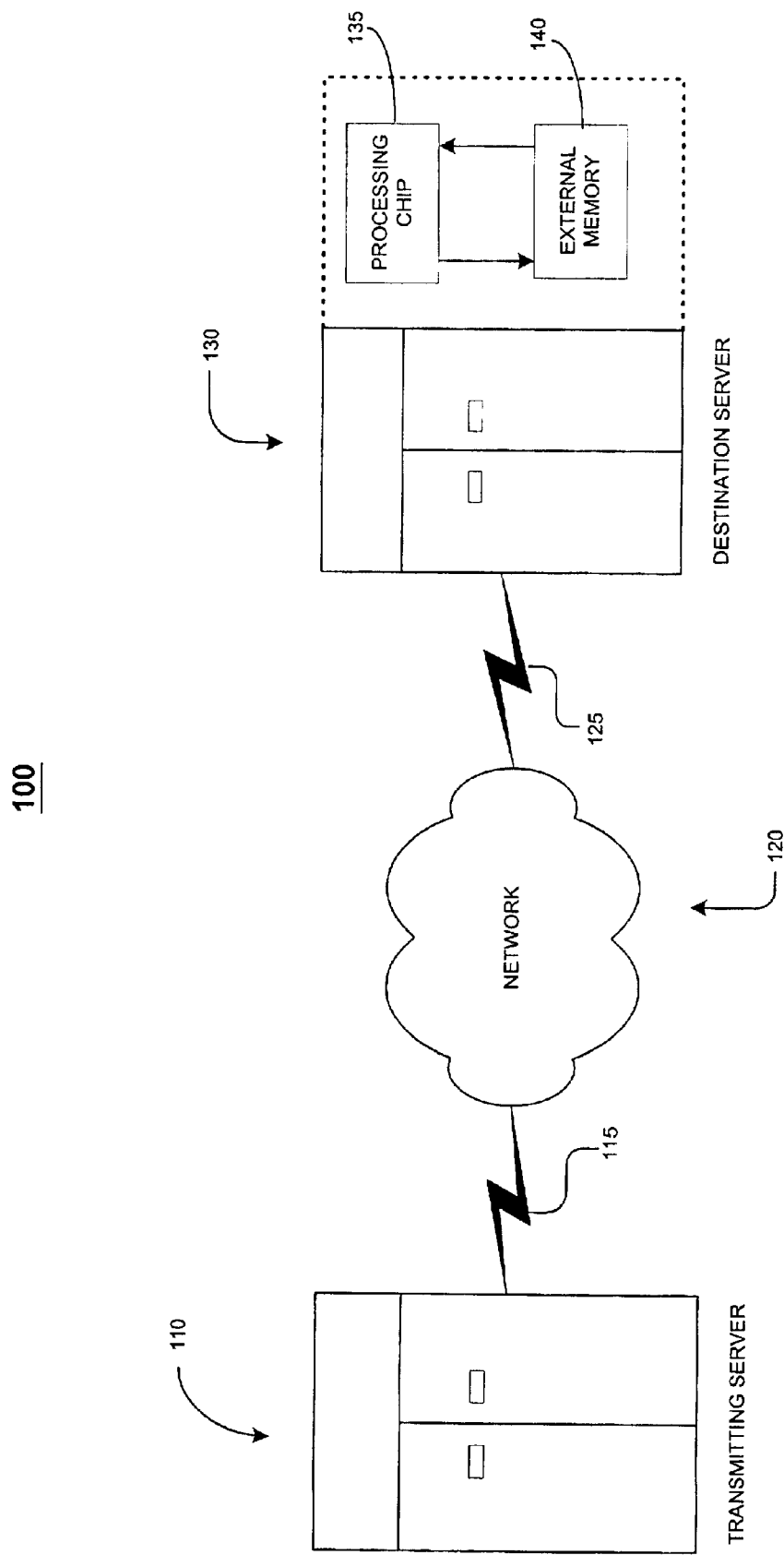
FIG. 1 is a diagram of a packet-switching network.

A typical packet-switching system 100 is shown in FIG. 1. In the system 100, a transmitting server 110 is connected through a communication pathway 115 to a packet-switching-network 120 that is connected through a communication pathway 125 to a destination server 130. The transmitting server 110 sends a message as a series of packets to the destination server 130 through the packet-switching network 120. In the packet-switching network 120, the packets typically pass through a series of servers. As each packet arrives at a server, the server stores the packet briefly before transmitting the packet to the next server. The packets proceed through the network until they arrive at the destination server 130. The destination server 130 contains memory partitions on one or more processing chips 135 and on one or more external memory chips 140. The external memory chips 140 may use various memory technologies, including SDRAM (synchronous dynamic random access memory).

For illustrative purposes, a particular implementation of a packet-switching system is described. For ease of description, a particular implementation in which a message may be any length, a packet may vary from 1 to 64 bytes, and the memory partition size is 64 bytes is used. Many implementations may employ variable-length packets having maximum packet sizes and memory partition sizes larger than 64 bytes. For example, maximum packet sizes of two megabytes or four megabytes may be used.

Packet-switching systems may manage data traffic by maintaining a linked list of the packets. A linked list may include a series of packets stored in partitions in external memory, such that the data stored in one partition points to the partition that stores the next data in the linked list. As the data are stored in external memory, memory space may be wasted by using only a portion of a memory partition.

Figure 2:
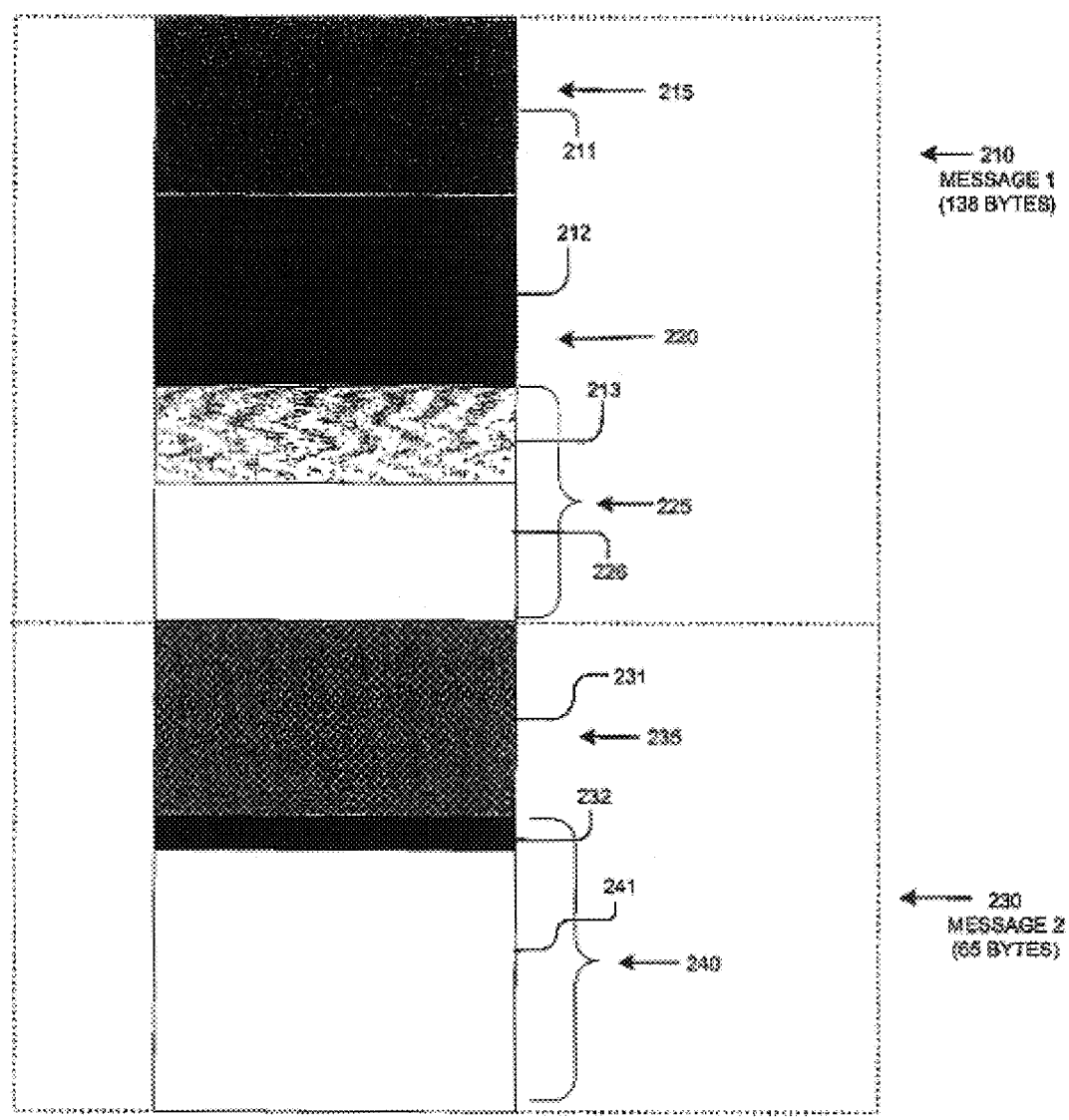
FIG. 2 is a block diagram illustrating the contents of an external memory chip containing variable-length packets.

As shown in FIG. 2, a substantial amount of memory in an external memory chip 200 may be wasted. In particular, a message 210, which is 138 bytes long and includes three packets 211, 212 and 213, uses three external memory partitions 215, 200 and 225 to store the packets 211, 212 and 213. External memory partitions 215 and 220 are full (that is, there is no unused space) because packets 211 and 212 are 64 bytes long, which equals the external memory partition size. However, external memory partition 225 stores packet 213, which has a length of 10 bytes, and an unused portion 226 of external memory partition 225 includes 55 unused bytes.

As also illustrated in FIG. 2, a message 230, which is 65 bytes long and includes two packets 231 and 232, uses two external memory partitions 235 and 240 to store the packets 231 and 232. External memory partition 235 has no unused space because packet 231 is 64 bytes long, which equals the external memory partition size. External memory partition 240 stores packet 232, which is one byte long. An unused portion 241 of memory partition 240 includes 63 unused bytes. In addition, in this example, an entire clock cycle is used to access a external memory partition only to write one byte.

The efficiency of accessing memory depends on the message length distribution. If many of the messages are large (i.e., including multiple maximum size packets and up to one packet of less than maximum size), the access efficiency will be high because many partitions will be filled. However, some types of communication traffic may have a more equal distribution of large messages (e.g., data) and small messages (e.g., control messages). This may result in inefficient memory access, which may be more problematic when external memory uses memory technologies, such as SDRAM, having high access latency for random accesses. Memory access efficiency may be improved by transferring full partitions of data.

The number of full partitions written to external memory may be increased by temporarily storing packets using on-chip memory that is on a chip with the processor. Before writing packets to external memory, packets of length smaller than the external memory partition size may be temporarily stored in the on-chip memory until an amount corresponding to a full or nearly full partition has been collected, at which point the data can be efficiently written to an external memory partition. By storing small packets in on-chip memory, the number of block transfers is reduced, the memory bandwidth used is increased, and memory space is saved as more full partitions are written to, or read from, external memory.

Figure 3:
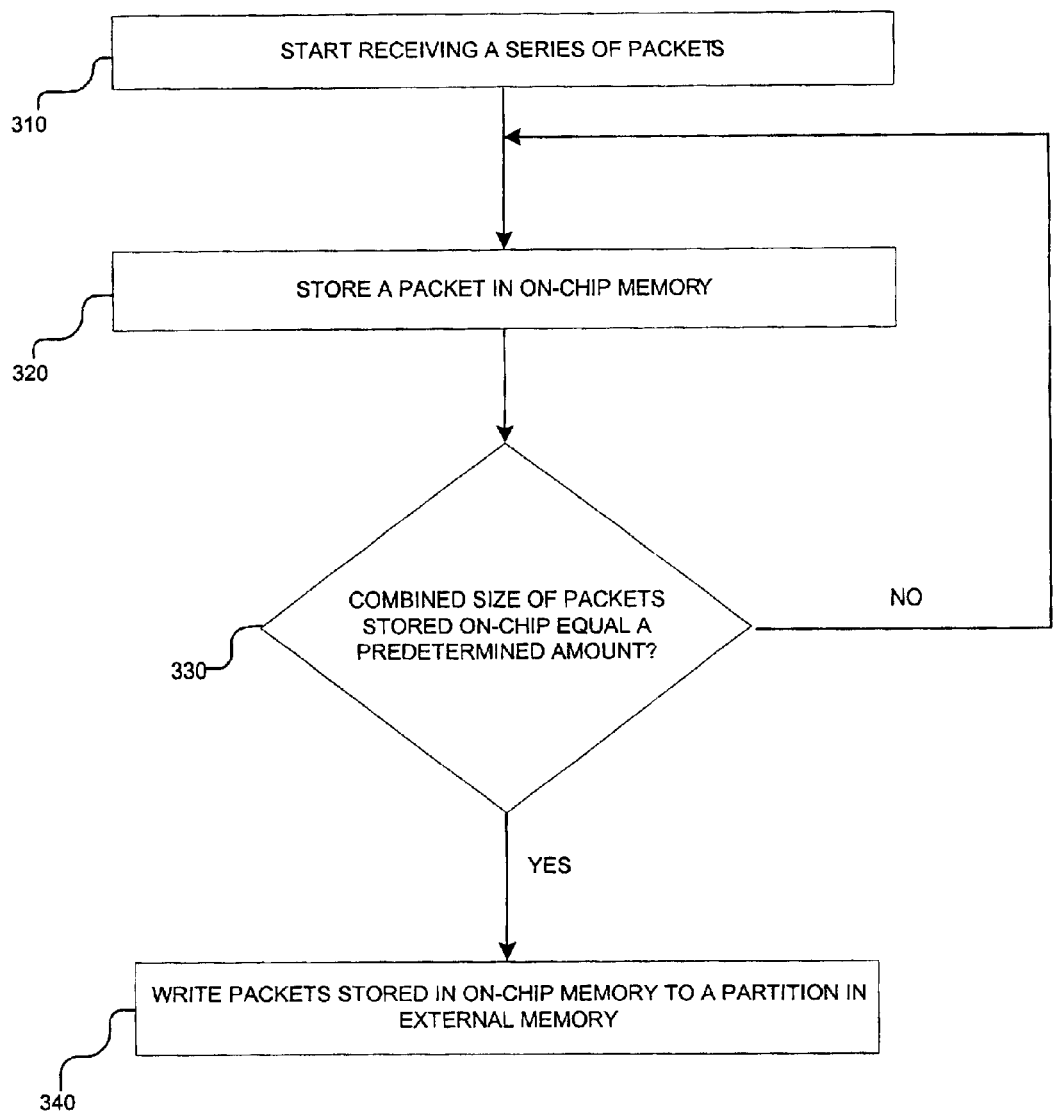
FIG. 3 is a flow chart of a process performed to write a packet to external memory.

As illustrated in FIG. 3, a procedure 300 for increasing memory access efficiency for packet applications begins when a processor starts receiving a series of packets (310), at which point the processor stores a packet in on-chip memory (320). The processor determines whether the size of the packet stored in on-chip memory (or the combined size of multiple packets if multiple packets are stored) equals a predetermined amount (330), such as, for example, the external memory partition size, and if not, stores another packet in on-chip memory (320). When the combined size of the stored packets equals a predetermined amount, the processor writes the data stored in on-chip memory to an external memory partition (340), stores another packet in on-chip memory (320), and proceeds as described above. In another implementation, the processor writes the data stored in on-chip memory to an external memory partition when the amount of data stored in the on-chip memory, in combination with the amount of data in the next partially-filled packet, exceeds the size of the external memory partition.

Figure 4:
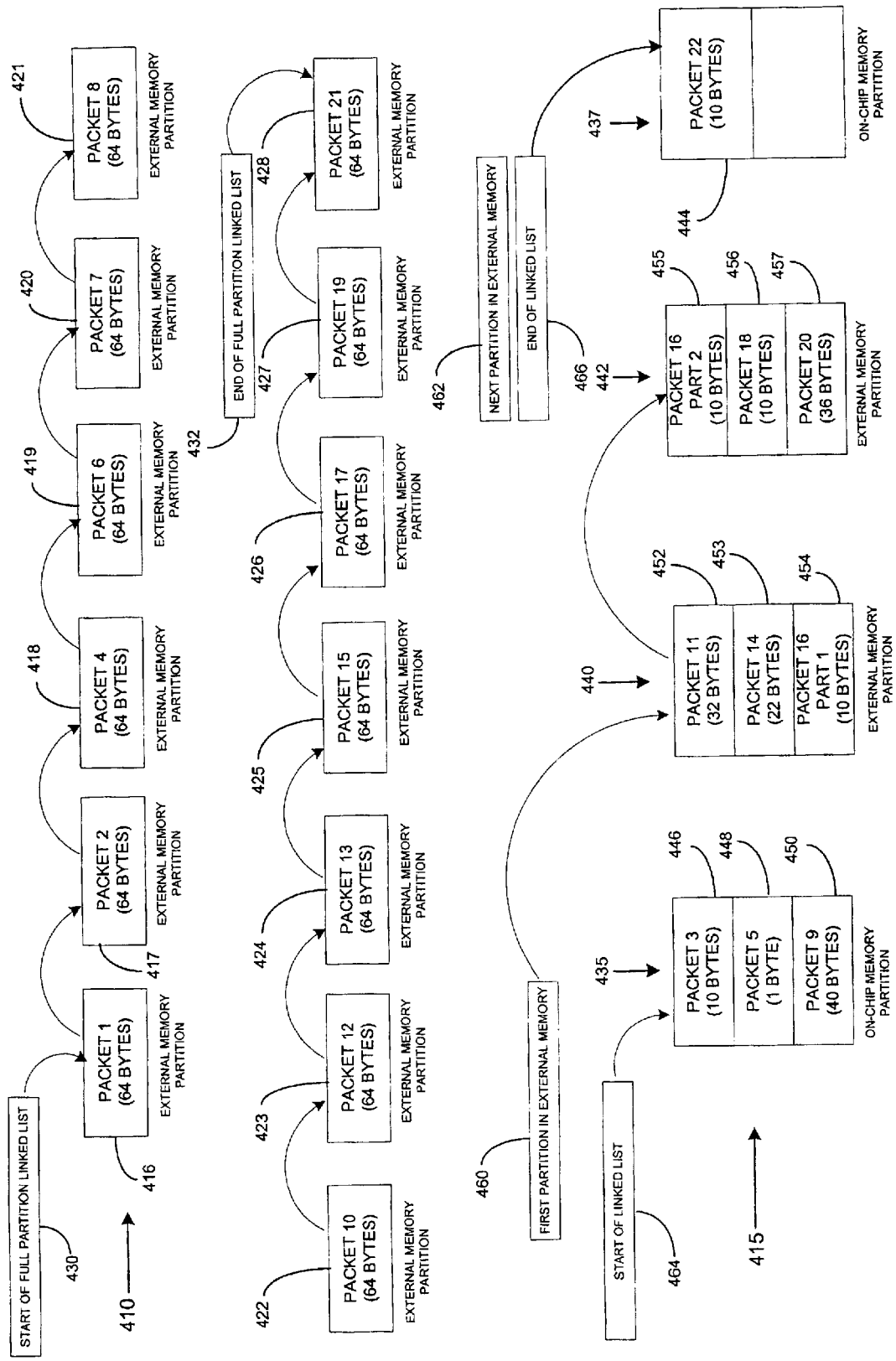
FIG. 4 is a diagram illustrating the memory structure of a linked list of packets stored in on-chip memory and external memory.

As shown in FIG. 4, increasing memory access efficiency by buffering packets using on-chip memory may be accomplished, for example, by maintaining two linked lists for incoming packets. One linked list 410 is used to store packets having a length equal to the external memory partition size and the other linked list 415 is used to store packets having a length that is less than the external memory partition size. As packets are received, each packet is added to the linked list 410 if the packet length is equal to the external memory partition size or to the linked list 415 if the packet length does not. For brevity, only a small number of external memory partitions are shown.

A linked list 410 of full partitions contains packets 416–428 having lengths equal to the external memory partition size and uses a start-of-full-partition-linked-list pointer 430 and an end-of-full-partition-linked-list pointer 432.

A linked list 415 stores any packet having a length less than the external memory partition size (e.g., partial-partition packets) and may be implemented using two on-chip memory partitions 435 and 437 and external memory partitions 440 and 442. As packets are received, on-chip memory partition 437 temporarily stores each partial-partition packet (here, 444) until an amount of data equal to the external memory partition size has been collected, at which point the data can be written efficiently to an external memory partition 440 or 442. A packet may be stored in more than one external memory partition.

On-chip memory partition 435 temporarily stores partial-partition packets 446, 448, and 450 as the partial-partition packets are read from external memory partition 440. External memory partitions 440 and 442 store multiple packets 452–454 and 455–457 having lengths less than the external memory partition size. A first portion of a sixteenth packet 454 is written to external memory partition 440, and a second portion of a sixteenth packet 455 is written to external memory partition 442.

The linked list 415 uses a first-partition-in-external-memory pointer 460 (here, pointing to external memory partition 440), and a next-partition-in-memory pointer 462, a start-of-linked-list pointer 464 (here, pointing to on-chip memory partition 435), and an end-of-linked-list pointer 466 (here, pointing to on-chip memory partition 437). Other memory structures may also be used.

A partial-partition packet having a size equal to the external memory partition size may be stored in the linked list 415 having packets that are smaller than the external memory partition size or may also be stored in the linked list 410 of full partitions.

Implementations may include temporarily storing packets having a length less than the external memory partition size in on-chip memory for a single flow of packets or for multiple flows belonging to the same virtual output queue ("VoQ").

Figure 5:
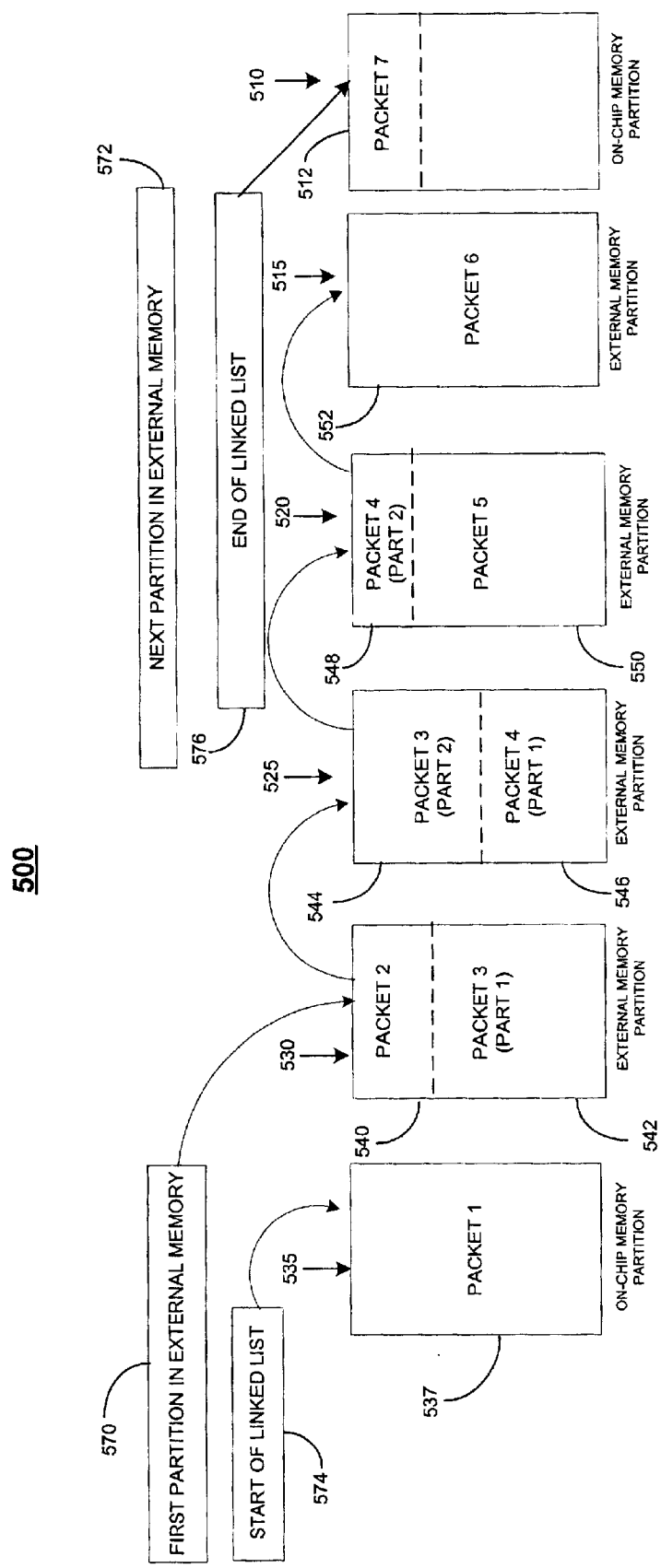
FIG. 5 is a diagram illustrating the memory structure of two linked lists of packets stored in external memory and on-chip memory.

As shown in FIG. 5, increasing memory access efficiency by buffering packets using on-chip memory may be accomplished for a single flow of packets, for example, by maintaining a linked list 500 of all packets received, regardless of whether an individual packet length is equal to the external memory partition size. As shown in FIG. 5, writing on-chip memory partition 510 temporarily stores each packet (here, packet 512) until an amount corresponding to the external memory partition size has been collected, at which point the data can be written efficiently to external memory partitions 515, 520, 525, and 530. A packet may be stored in more than one external memory partition.

A reading on-chip memory partition 535 stores the data read from external memory partitions (here, a first packet 537).

The linked list 500 stores a second packet 540 and the first portion of a third packet 542 grouped together and written to a single external memory partition 530; the second portion of a third packet 544 and the first portion of a fourth packet 546 grouped together and written to a single external memory partition 525; the second portion of a fourth packet 548 and a fifth packet 550 grouped together to a single written and external memory partition 520; and a sixth packet 552 having a length equal to the external memory partition size and written to external memory partition 515.

External memory partitions 515, 520, 525, and 530 do not have unused memory space. The linked list 500 uses a first-partition-in-external-memory pointer 570 (here, pointing to external memory partition 530), a next-partition-in-external-memory pointer 572, a start-of-linked-list pointer 574 (here, pointing to on-chip memory partition 535), and a end-of-linked-list pointer 576 (here, pointing to on-chip memory partition 510).

Figure 6:
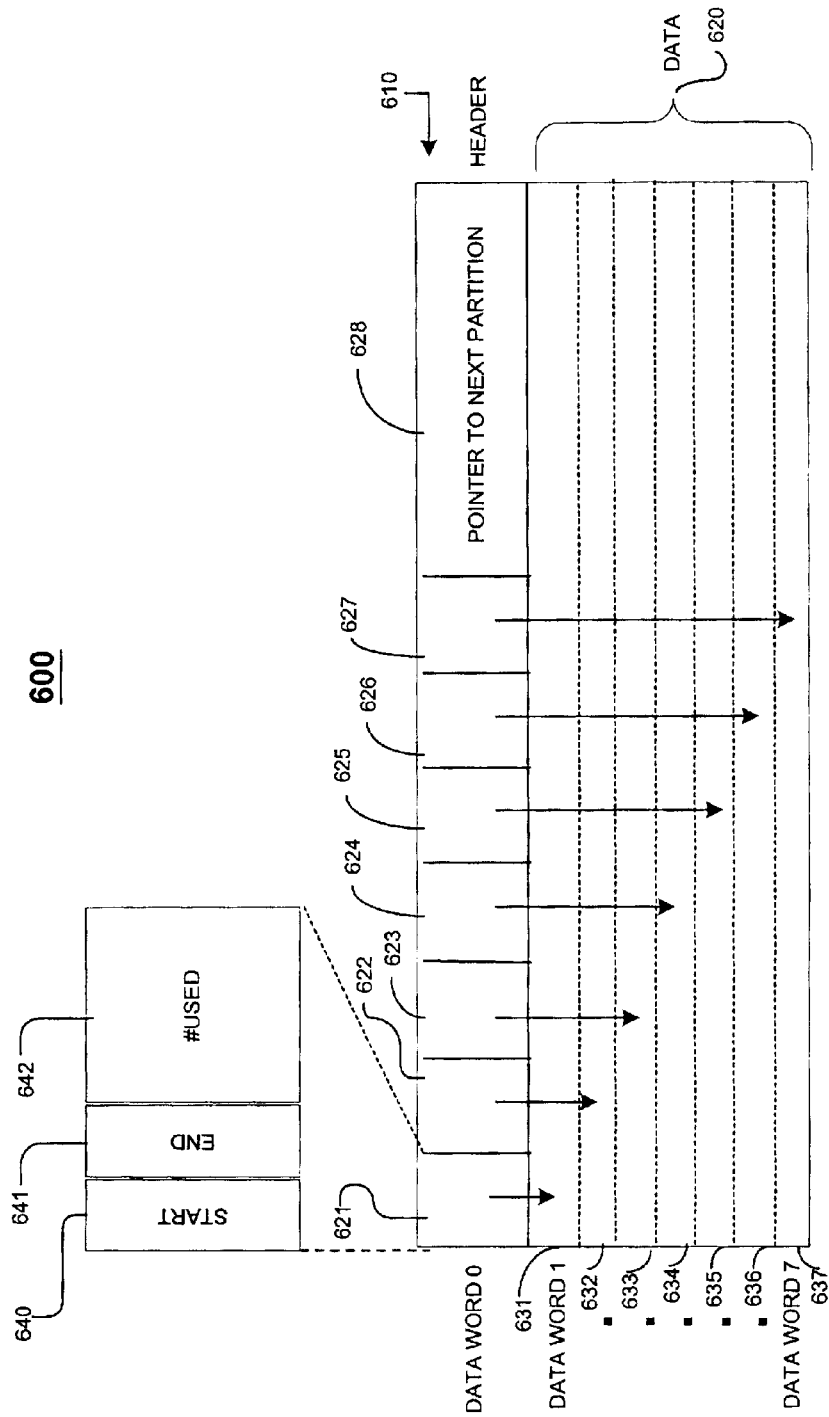
FIG. 6 is a diagram illustrating the format for a 64-byte memory partition that holds partial-partition packets.

FIG. 6 shows the memory format 600 for packets having a length less than the external memory partition size when the packets are stored in on-chip memory partitions or external memory partitions. The illustrated implementation uses 64-byte partitions composed of 8-byte words. The first word 610 is used as a header to store control information about the other data words 620 in the packet. Control information 621–627 in the header 610 corresponds to particular data words 631–637. For example, control information about a first data word 631 is stored in item 621, control information about a second data word 632 is stored in item 622, and so on.

The control information 621–627 for each data word 631–637 includes a start of packet bit 640 that indicates if a packet starts in the corresponding word, an end of packet bit 641 that indicates if a packet ends in the corresponding data word, and a #used field 642 that indicates the number of bits used to store the packet. The #used field 642, however, only contains data when the corresponding word stores the end of a packet. In addition, the header control information 610 contains a pointer to the next packet partition 628. The remaining words 631–637 in the partition consist of data in the packet 620.

Figure 7:
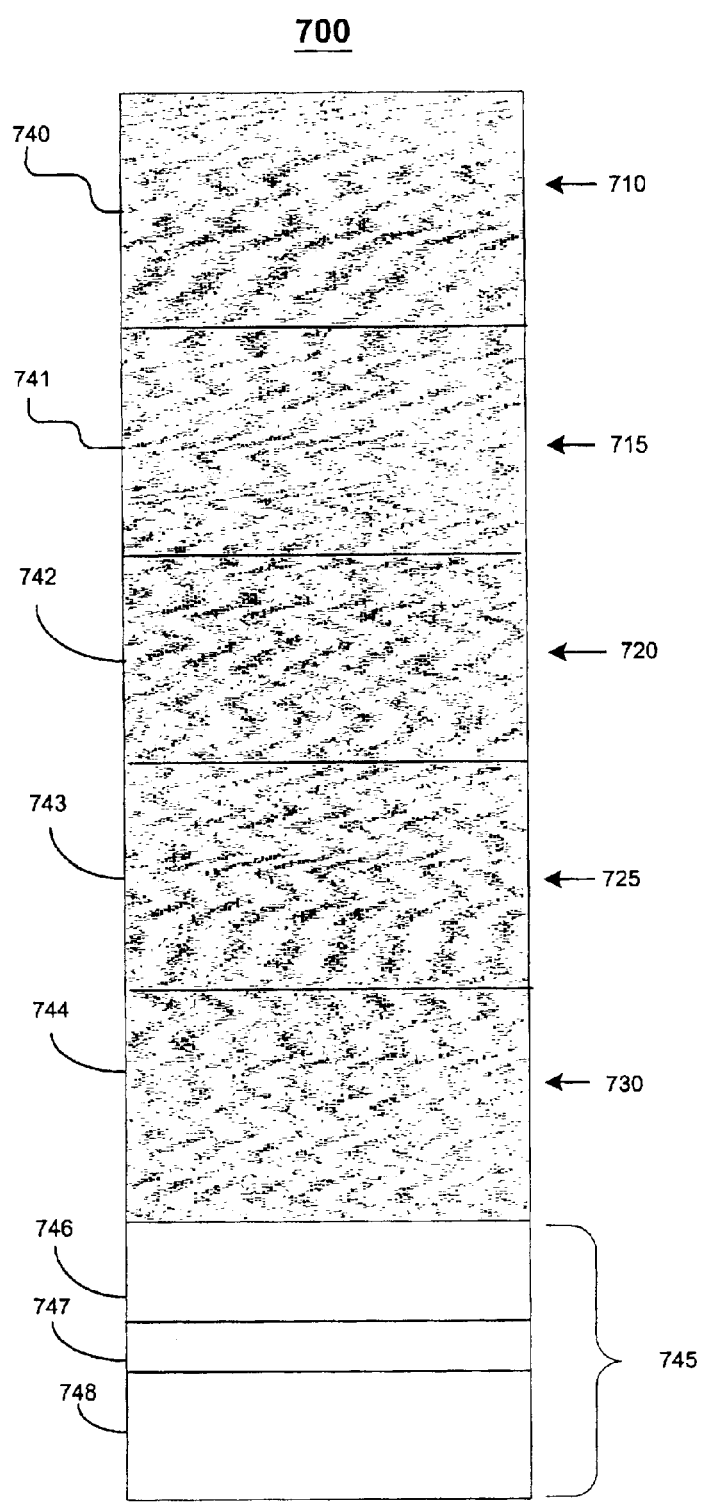
FIG. 7 is a block diagram illustrating the contents of an external memory chip storing variable-length packets.

As illustrated by FIG. 7, increasing memory access efficiency by buffering packets using on-chip memory may result in external memory partitions that have a reduced amount of unused space. External memory partitions 710, 715, 720, 725, and 730 each store, respectively, a packet 740, 741, 742, 743, and 744, each of which has a length equal to the external memory partition size. External memory partition 745 stores packets 746, 747, and 748, all of which have lengths less than the external memory partition size. Packets 746–748 are grouped together and written to external memory partition 745 when an amount equal to the external memory partition size has been collected.

Figure 8:
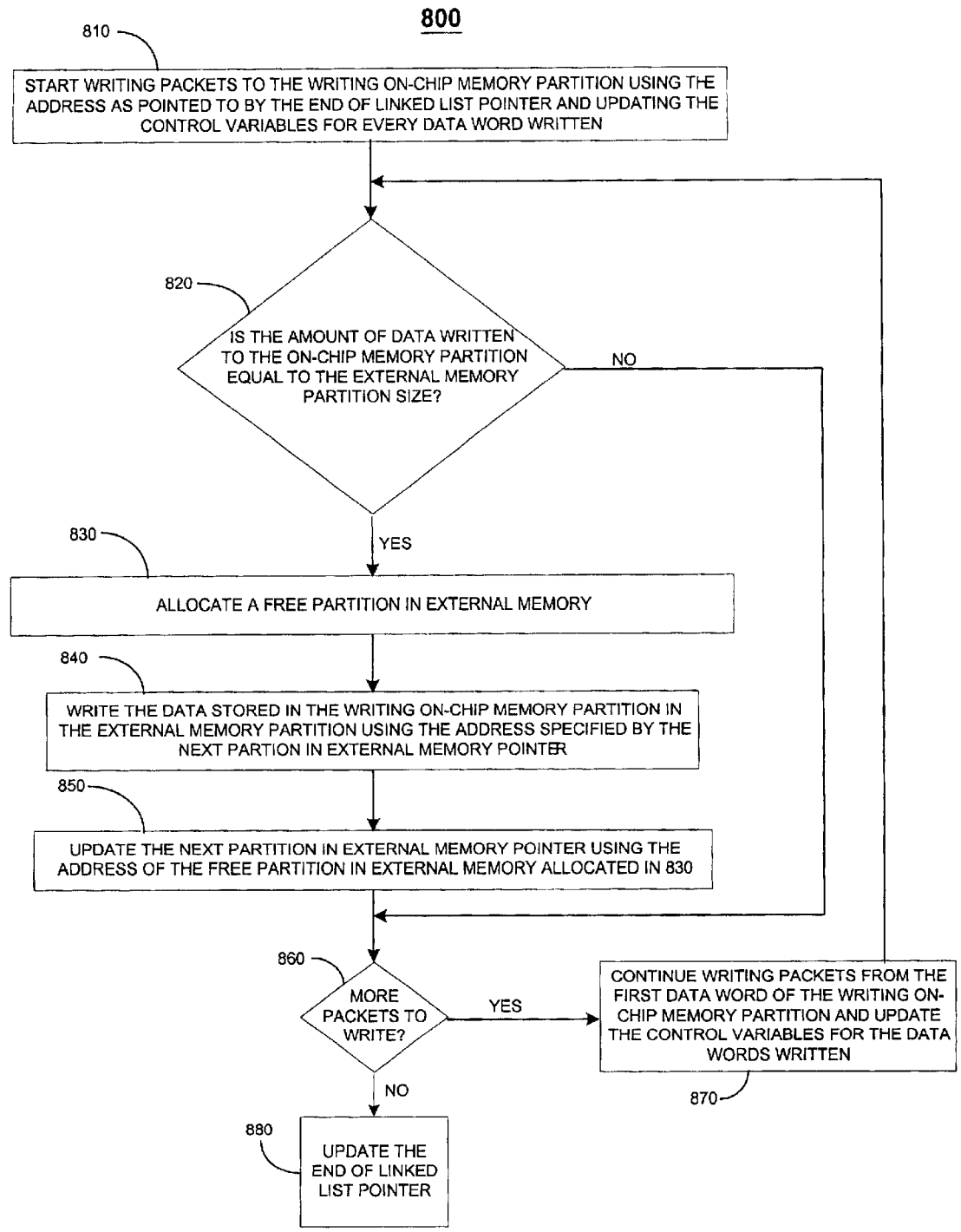
FIG. 8 is a flow chart of a process performed to write a series of partial-partition packets to external memory.

FIG. 8 illustrates a process 800 for writing to external memory, such as SDRAM, a series of partial-partition packets having a length less than the external memory partition size. The process starts by writing packets to the writing on-chip memory partition (such as on-chip memory partition 437 in FIG. 4) as indicated by an end-of-linked-list pointer, and updating the control variables (such as start of packet bit 640, end of the packet bit 641, and #used field 642 of FIG. 6) for every data word written (810).

The process determines whether the writing on-chip memory partition is full (e.g., whether the amount of data stored in the on-chip memory partition equals the external memory partition size)(820), and, if so, the process allocates a free partition in external memory (830). The data in the writing on-chip partition are written to an external memory partition having the address specified by the next-partition-in-external-memory pointer (840), and the next-partition-in-external-memory pointer is updated using the address of the previously-allocated free external memory partition (850).

The process determines whether additional packets are to be written (860), and, if so, the process starts writing from the first data word in the writing on-chip partition and updates the control variables for the data words that are being written (870). The process then, as described above, determines whether the amount of data written to the writing on-chip memory partition equals the external memory partition size (820).

After all the packets have been written, the end-of-linked-list pointer is updated (880) with the address of the external memory partition which stores the last packet data.

The process 800 of writing a series of partial-partition packets may be modified where the end-of-linked list pointer points to the reading on-chip memory partition, which may occur, for example, if the rate of receiving data is low. If the end-of-linked-list pointer points to the reading on-chip memory partition, the packet is written to the reading on-chip memory partition directly and is not written to the writing on-chip memory partition or an external memory partition. Writing the packet directly to the reading on-chip partition ensures that the packet is available when the processor is ready to read the packet.

Reading packets having lengths less than the external memory partition size, and which have been stored in external memory partitions using a process to increase memory access efficiency, generally involves buffering external memory partition data using an on-chip memory partition from which the processor reads the packet. The read external memory partition may be stored in an on-chip memory partition because an external memory partition may store more than one packet.

Figure 9:
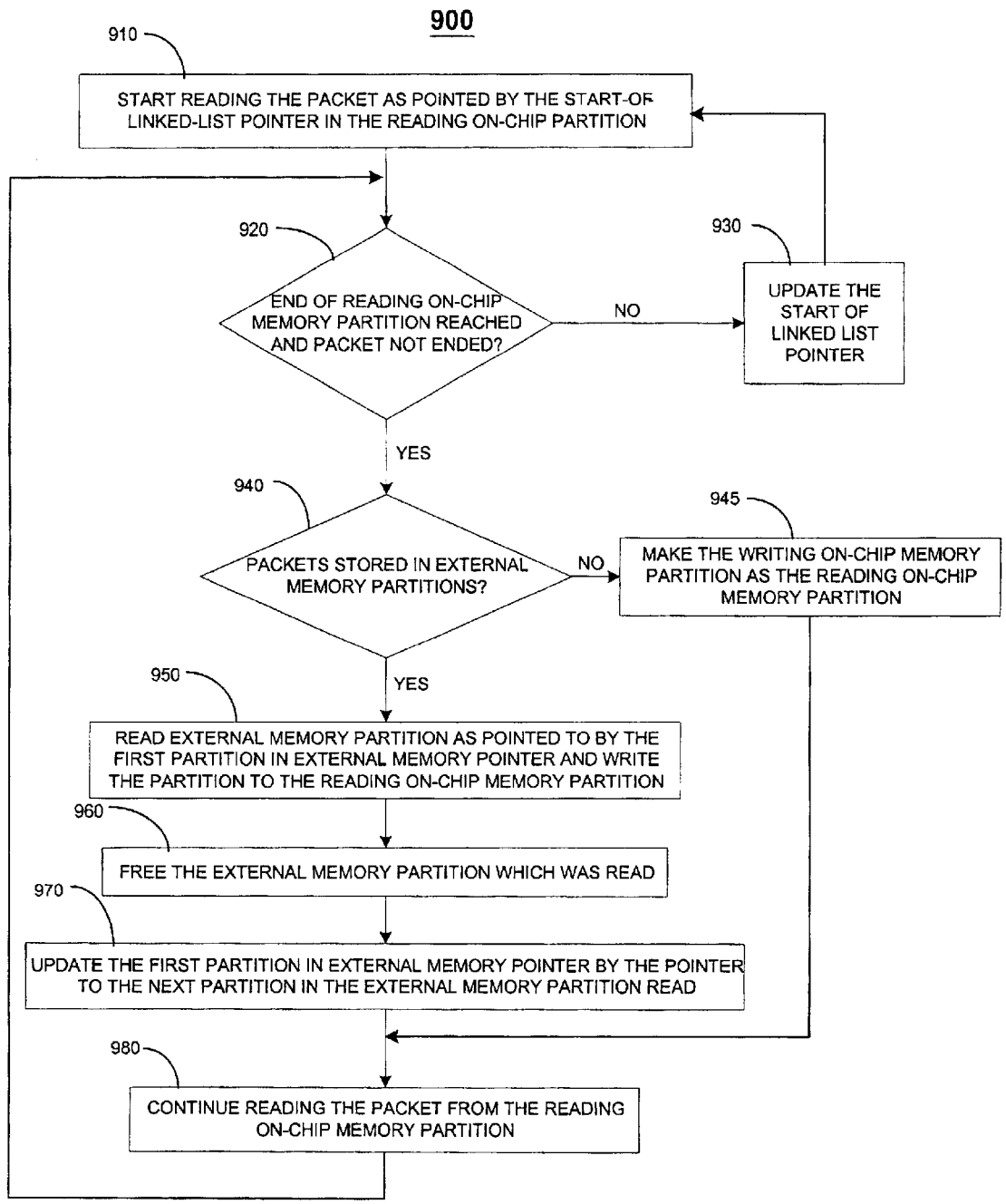
FIG. 9 is a flow chart of a process performed to read a partial-partition packet from external memory.

FIG. 9 illustrates a process 900 for reading packets having lengths less than the external memory size and stored in external memory partitions. The process 900 begins when the processor starts to read the packet in the reading on-chip memory partition as indicated by the start-of-linked-list pointer (910). The process determines whether the end of the reading on-chip memory partition has been reached and the packet has not ended (920), and, if so, the process determines whether packets are stored in external memory partitions (940), which may be accomplished by comparing the first-partition-in-external-memory pointer with the next-partition-in-external-memory pointer. If the pointers are the same, no packets are stored in external memory partitions. If the pointers are different, packets are stored in external memory partitions.

If the process determines that packets are stored in external memory, the processor reads a partition from external memory as indicated by the first-partition-in-external-memory pointer and writes the external memory partition to the reading on-chip partition (950), frees the external memory partition which was read (960), and updates the first-partition-in-external-memory pointer using the pointer to the next external memory partition in the partition read from external memory (970). The process continues reading the packet from the reading on-chip partition (980) and proceeds as before by determining whether the end of the reading on-chip memory partition has been reached and the packet has not ended (920).

If the processor determines that the end of the reading on-chip memory partition has not been reached and the packet has ended (920), the process updates the start-of-linked-list pointer to point to the next packet stored in the reading on-chip memory partition (930) and starts reading the packet as indicated to by the start-of-linked-list pointer (910) as previously described.

Although a particular implementation of a packet-switching system has been used for illustrative purposes, the benefits of increasing memory access efficiency for packet applications are not limited to that implementation but are equally applicable to other implementations, such as, for example, implementations using a maximum packet size for variable-length packets other than 64 bytes, a memory technology other than SDRAM, and a memory partition size other than 64 bytes.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

What is claimed is:

1. A memory access method for a packet-switching application, the method comprising:

receiving a series of packets at a processor having on-chip memory formed on a chip with the processor, storing multiple packets in the on-chip memory, the multiple packets including one or more packets in a sequence of packets from the series of packets, and writing the stored packets to a partition in external memory in response to a combined size of stored packets equaling a predetermined amount.

2. The method of claim 1 wherein receiving a series of packets comprises receiving a series of packets belonging to a single flow of packets, the method further comprising forming a linked list that links the series of packets such that each packet is linked to a next packet stored in external memory.

3. The method of claim 1, the method further comprising storing contents of a partition of external memory to the on-chip memory when reading the partition of external memory.

4. The method of claim 2 wherein:

storing multiple packets comprises only storing packets from the series of packets which are individually smaller than the size of the partition, and forming a linked list comprises forming a small packet linked list using only packets from the series of packets which are individually smaller than the size of the partition, the method further comprising forming a full partition linked list in external memory using only packets from the series of packets which are sized equal to the size of the partition and without storing the packets in on-chip memory.

5. The method of claim 4 wherein the external memory comprises synchronous dynamic random access memory.

6. The method of claim 4 wherein the series of packets comprises a series of variable-length packets.

7. The method of claim 4 wherein receiving a series of packets comprises receiving a series of packets belonging to a virtual output queue.

8. The method of claim 4, the method further comprising storing the contents of a partition of external memory to the on-chip memory when reading a partition of external memory storing packets belonging to the small packet linked list.

9. The method of claim 8 wherein:

receiving a series of packets comprises receiving a particular series of packets at a rate such that a particular packet which is individually smaller than the size of the partition is not written to the partition in external memory before the particular series of packets is read from external memory, and forming the full partition linked list comprises linking the particular packet into the full partition linked list.

10. An apparatus for a packet-switching application, the apparatus including:

a processor;

on-chip memory formed on a chip with the processor; and external memory comprising a second chip connected to the processor;

wherein the processor comprises one or more components to:

receive a series of packets, store multiple packets in the on-chip memory, the multiple packets including one or more packets in a sequence of packets from the series of packets, and write the stored packets to a partition in the external memory in response to a combined size of stored packets equaling a predetermined amount.

11. The apparatus of claim 10 wherein the processor comprises an input device to receive a series of packets belonging to a single flow of packets, the processor further comprises one or more components to form a linked list that links the series of packets such that each packet is linked to a next packet stored in external memory.

12. The apparatus of claim 10, the processor further comprises one or more components to store contents of a partition of external memory to the on-chip memory when reading the partition of external memory.

13. The apparatus of claim 11 wherein the processor comprises one or more components to:

store only packets from the series of packets which are individually smaller than the size of the partition, and form a small packet linked list using only packets from the series of packets which are individually smaller than the size of the partition, the processor further comprises one or more components to form a full partition linked list in external memory using only packets from the series of packets which are sized equal to the size of the partition and without storing the packets in on-chip memory.

14. The apparatus of claim 13 wherein the processor comprises one or more components to write stored packets to a partition in synchronous dynamic random access memory.

15. The apparatus of claim 13 wherein the processor comprises one or more components to receive a series of variable-length packets.

16. The apparatus of claim 13 wherein the processor comprises one or more components to receive a series of packets belonging to a virtual output queue.

17. The apparatus of claim 13, the processor further comprises one or more components to store the contents of a partition of external memory to the on-chip memory when reading a partition of external memory storing packets belonging to the small packet linked list.

18. The apparatus of claim 17 wherein the processor comprises one or more components to:

receive a particular series of packets at a rate such that a particular packet which is individually smaller than the size of the partition is not written to the partition in external memory before the particular series of packets is read from external memory, and link the particular packet into the full partition linked list.

19. A computer readable medium or propagated signal having embodied thereon a computer program configured to cause a processor to implement a packet-switching application, the computer program comprising:

a code segment configured to cause a processor to receive a series of packets, a code segment configured to cause a processor to store multiple packets in the on-chip memory, the multiple packets including one or more packets in a sequence of packets from the series of packets, and a code segment configured to cause a processor to write the stored packets to a partition in external memory in response to a combined size of stored packets equaling a predetermined amount.

20. The medium of claim 19 wherein receiving a series of packets comprises receiving a series of packets belonging to a single flow of packets, the medium further comprising a code segment configured to cause a processor to form a linked list that links the series of packets such that each packet is linked to a next packet stored in external memory.

21. The medium of claim 19, the medium further comprising a code segment configured to cause a processor to store contents of a partition of external memory to the on-chip memory when reading the partition of external memory.

22. The medium of claim 20 wherein:

storing multiple packets comprises only storing packets from the series of packets which are individually smaller than the size of the partition, and forming a linked list comprises forming a small packet linked list using only packets from the series of packets which are individually smaller than the size of the partition, the medium further comprising a code segment configured to cause a processor to form a full partition linked list in external memory using only packets from the series of packets which are sized equal to the size of the partition and without storing the packets in on-chip memory.

23. The medium of claim 22 wherein the external memory comprises synchronous dynamic random access memory.

24. The medium of claim 22 wherein the series of packets comprises a series of variable-length packets.

25. The medium of claim 22 wherein receiving a series of packets comprises receiving a series of packets belonging to a virtual output queue.

26. The medium of claim 22, the medium further comprising a code segment configured to cause a processor to store the contents of a partition of external memory to the on-chip memory when reading a partition of external memory storing packets belonging to the small packet linked list.

27. The medium of claim 26 wherein:

receiving a series of packets comprises receiving a particular series of packets at a rate such that a particular packet which is individually smaller than the size of the partition is not written to the partition in external memory before the particular series of packets is read from external memory, and forming the full partition linked list comprises linking the particular packet into the full partition linked list.

28. A system for a packet-switching application, the system comprising:

a processor having on-chip memory formed on a chip with the processor and external memory comprising a second chip connected to the processor;

a port coupled to a transmission channel; and a link between the processor and the port, wherein the processor comprises one or more components to:

receive a series of packets from the port, store multiple packets in the on-chip memory, the multiple packets including one or more packets in a sequence of packets from the series of packets, and writing the stored packets to a partition in external memory in response to a combined size of stored packets equaling a predetermined amount.

29. The system of claim 28 wherein the processor further comprises one or more components to:

store only packets from the series of packets which are individually smaller than a size of a partition of external memory, form a small packet linked list using only packets from the series of packets which are individually smaller than the size of the partition, and form a full partition linked list in external memory using only packets from the series of packets which are sized equal to the size of the partition and without storing the packets in on-chip memory.

30. The system of claim 28 wherein the processor further comprises one or more components to store the contents of a partition of external memory to the on-chip memory when reading a partition of external memory storing packets belonging to the small packet linked list.

* * * * *